Patented Mar. 3, 1931

1,795,199

UNITED STATES PATENT OFFICE

JOHN R. COUTURE, OF WILMINGTON, DELAWARE, ASSIGNOR TO E. I. DU PONT DE NEMOURS & COMPANY, OF WILMINGTON, DELAWARE, A CORPORATION OF DELAWARE

RUBBER-COATED FABRIC

No Drawing.   Application filed July 15, 1926.   Serial No. 122,737.

This invention relates to the production of rubber-coated fabric such as is used for automobile tops, both for the open and closed type of automobile, for upholstery and other similar purposes. It relates in particular to the production of rubber-coated fabric having a smooth, durable finish which retains its gloss for a long time, even when exposed to severe weather conditions.

It has been customary to finish rubber-coated fabrics with some kind of protective top coat, the purpose being to protect the rubber from too rapid oxidation, to give the product a suitable gloss, and to provide a smooth surface which does not too readily become unsightly due to accumulation of dust and dirt. The difficulty has been, however, that when used over a rubber base the ordinary protective coatings, although satisfactory in appearance when first applied, have a very short life when exposed to outside weather conditions, especially when continuously exposed to the direct rays of the summer sun. Various types of protective coatings have been used but all of these, so far as I am aware, are of comparatively short life when used on rubber-coated fabrics. In the prior art the most usual type of protective coating for this purpose is a long oil varnish made with drying oils and various combinations of varnish resins together with thinners. Although the material used may be a high grade varnish and may show a comparatively long life when tested on a wood or metal base, the universal experience has been that when used on a rubber fabric base the best of the prior art varnishes are of very short life and when exposed to severe outside conditions, such as direct sunlight, the lustre soon becomes dulled and, if continuously exposed, will within a few days or weeks at the most become checked and unsightly. Thus, the behavior of the oil varnishes, as well as of other prior art protective coatings when used over rubber, is apparently without relation to the inherent durability of the same protective coatings when exposed under other conditions as, for example, when spread on wood or on metal. Even a double coat of high grade oil varnish gives only a slightly improved resistance to weathering and, at best, after several weeks, continuous exposure to summer sun the material is badly dulled.

Now, I have discovered a process whereby these difficulties may be overcome and a rubber-coated fabric prepared, having a durable finish which retains its gloss for a comparatively long time, even under severe conditions of exposure. My process is capable of various modifications but the essential feature comprises the application over the uncured rubber of a final coat of asphalt varnish, after which the finish is dried by baking at a temperature which is suitable for vulcanization of the rubber compound and which is somewhat higher than the softening point of the asphalt, thereby causing the asphalt to fuse and to form a smooth, glossy, opaque film which is chemically highly inert and which protects the rubber from the disintegrating effect of air and of sunlight. In a modification of my process which gives even better results I use a two-coat system in which the final coat of asphalt varnish is applied over an intermediate coat of oil varnish, after which the goods are baked to complete the vulcanization and to condition the asphalt film.

The asphalt varnish which forms the final coat in all modifications of my process may be either a straight solution of asphalt in a suitable volatile solvent such as gasoline, mineral thinner, benzene, toluene, turpentine, etc., or there may be incorporated with the asphalt a drying oil such as Chinawood oil, linseed oil, etc., in addition to the thinners mentioned above. The purpose in using the drying oil is to decrease the brittleness of the asphalt when it is spread in a thin film. From 2½ to 7½ gallons of oil to 100 lbs. of asphalt is generally sufficient for this purpose, but in some cases where a high degree of elasticity is desired I may use with good results as high as 15 or even 20 gallons of oil per 100 lbs. of asphalt. My preferred compositions, however, contain less oil than asphalt. Pigments may be ground with the oil before mixing with the asphalt where it is desired to produce colored products or to obtain additional protection against sunlight.

When oil is used in this asphalt varnish I prefer to use drying oils such as Chinawood oil, linseed oil, etc., which have been bodied by heat treatment and which contain a sufficient quantity of drier, such as the percentage of driers usually used in making varnishes, to induce the desired hardness of film and rapidity of drying. The bodying is more important with Chinawood oil than with linseed oil, and especially in the longer oil length varnishes, owing to the known tendencies of raw Chinawood oil varnishes to wrinkle on drying.

As the base material for my asphalt varnish I prefer to use a petroleum residue asphalt although other suitable asphaltic substances such as a refined natural asphalt, mineral pitch, gilsonite, stearin pitch, bitumen, etc., may be used. For the best results I prefer a petroleum asphalt having a softening point between 150° and 250° F. as determined by the ball and ring method described in A. S. T. M. Standards, 1921, p. 944, under the serial designation D-36-21.

By the term "asphalt varnish" as used in this specification and in the claims I designate a protective coating composition in which the film-forming constituent is asphalt with or without other ingredients such as drying oil and pigment and in which the proportion of oil is less than 160 of oil to 100 of asphalt. The term "asphalt" is not to be understood as restricted to natural asphalt and petroleum residue asphalt, but as including other similar products of an asphaltic nature, such as those enumerated in the preceding paragraph.

It is understood that my asphalt varnishes are distinctive compositions characterized by having suitable asphaltic substances as the basic film-forming constituent and they are not to be confused with ordinary varnish and enamel coating compositions.

The oil varnish which constitutes the intermediate coat in my two-coat system consists essentially of drying oil, gum and thinner. In addition, pigments may be used in some cases. The proportion of drying oil to gum may vary within rather wide limits, depending on the specific requirements. In some cases I may use a varnish having an oil length of 25 to 40 gallons per 100 lbs. of gum. In general, however, and especially where the maximum durability of product is required, I use a longer oil varnish in which the oil length is not less than 40 gallons and in some cases I may use a varnish of oil length up to 300 gallons or even higher.

As gums I may use any of the natural or synthetic varnish resins such as kauri, ester gum, hardened rosin, etc., and with these I may use various gums of an asphaltic nature such as stearin pitch, gilsonite, or petroleum asphalt. However, where a gum of an asphaltic nature is used in the oil varnish, it is necessary that the amount of asphaltic ingredient be kept low enough so that when the final coat is applied, the intermediate coat shall not be affected by the solvent of the final coat. To this end I prefer that when an asphaltic ingredient is used in the oil varnish, it shall be used in a proportion which is less than 25% of the drying oil, although up to 50% is permissible.

The oils which I use in preparing my oil varnish are the bodied drying oils containing driers such as are commonly used in the varnish trade.

By the term "oil varnish" as used in this specification and in the claims, I designate a protective coating composition in the drying or hardening of which there is involved the oxidation of a drying oil. This oil varnish may contain resins and/or ingredients of an asphaltic nature, but the asphaltic ingredients must not exceed one-half the weight of the drying oil, because higher proportions of asphalt may cause softening of the oil varnish by the asphalt varnish applied as a second coat.

In the one-coat system, which is the simplest form of my invention, the coat of asphalt varnish is applied over the uncured rubber and then subjected to a suitable temperature and for a sufficient time to vulcanize the rubber and to thoroughly fuse the asphalt film. By this treatment I obtain on the surface of the goods a smooth continuous film which is chemically inert and which remains for a long time unaffected by sunlight. The temperature and time of cure depend on the rubber compound and especially on the kind of accelerator used. As a rule, the temperature will lie between 240 to 275° F., and the time of cure will be from 30 minutes to 3 hours.

A double coat of asphalt varnish may be used, if desired, but the advantage of a double coat over a single coat is negligible and is scarcely to be distinguished from the result obtained with a single heavy coat of asphalt varnish. This will be clearly understood by consideration of the fact that the final baking at vulcanizing temperature would cause the two asphalt varnish coats to fuse together so that the effect is the same as if a single heavy coat had been used.

I find that by the use of my one-coat system, as described, I obtain a product having excellent durability and gloss retention and that the original brittleness of the asphalt film may be greatly reduced by the use of drying oil in suitable proportion. For example, using an asphalt varnish of about 12½ gal. oil length I obtain a product which is very satisfactory as to durability.

When using my two-coat system, I first apply over the uncured rubber an intermediate coat of oil varnish. This coat may be "air-dried", if desired, that is, dried at room temperature, but it is more advantageous from the cost standpoint to use a "force dry", that is, dry at an elevated temperature, but below the vulcanizing temperature. Thus, I usually dry for about 4 hours at 180° F., after which I apply the final asphalt varnish and finish by baking at a temperature of about 240° to 275° F. for such time as is required to complete the vulcanization of the rubber.

In some cases it is advantageous, after applying the intermediate oil varnish coat, to bake at the vulcanizing temperature for a portion of the vulcanizing period and to complete the vulcanization of the rubber by baking at the same temperature after the coat of asphalt varnish has been applied. This procedure somewhat shortens the total time required to complete the process but it is important that care should be taken on the one hand to avoid over-vulcanization of the rubber, and on the other hand that the final coat should receive not less than about one hour treatment at the full vulcanizing temperature in order to produce the best results and to properly condition the asphalt varnish film. However, I do not wish to limit my invention to a process which involves baking the final asphalt coat of a two-coat system. Excellent results are obtained with a two-coat system of which the first coat is a baked oil varnish and the second coat an air-dried asphalt varnish, and this finish is much superior to any that has previously been used.

By means of my two-coat system, as described, I obtain greatly improved results over the prior art products. In addition, I obtain results which are an improvement over those obtained by my one-coat system. By means of the device of the two-coat system of the particular kind which I have developed and disclosed, the final product is rendered practically free from the difficulty of streaking and scuffing when rubbed by a hard object such as the thumb nail. Furthermore, in the two-coat system the asphalt film may be rendered non-brittle by the use of a comparatively small amount of oil, and the tenderness of the film may be practically eliminated at the same time. The product obtained by the two-coat system is, in addition, more durable and retains its gloss for a longer time than that produced by the one-coat system.

The explanation of the superiority of the two-coat system is not definitely known, but I believe this to be due to the fact that the elastic intermediate coat of oil varnish acts as a buffer or bridge between the extremely elastic rubber compound and the comparatively inelastic asphalt varnish film. I believe further that the chemically inert asphalt varnish film behaves as a surface skin protecting the dried oil film of the oil varnish intermediate coat from further and destructive oxidation and at the same time, by reason of its opacity, protects both the oil varnish film as well as the rubber from the disintegrating effect of direct sunlight.

The examples given below illustrate various modifications in which my process may be carried out. In these examples the intermediate coat of oil varnish is applied directly over the uncured rubber-coated fabric and is dried for about 4 hours at 180° F. The final coat of asphalt varnish in these examples is applied over the intermediate coat of oil varnish in the two-coat system and over the uncured rubber fabric in the one-coat system. The asphalt used in the final coat is a petroleum asphalt having a softening point, as determined by the ball and ring method, between 180° and 220° F. After applying the final coat of asphalt varnish, the goods are finished in all cases by baking at a temperature of 240° to 275° F. for such time as is required to complete the vulcanization of the rubber. The percentage figures in the following examples indicate percentage by weight:

Example 1—One-coat system:
  Final coat—Asphalt varnish
    Petroleum asphalt ———————————— 25%
    Mineral thinner ———————————————— 75%
Example 2—One-coat system:
  Final coat—Asphalt varnish
    Petroleum asphalt ———————————— 20%
    Bodied Chinawood oil ————————— 20%
    Gasoline ———————————————————— 60%
Example 3—Two-coat system:
  Intermediate coat—Oil varnish
    Carbon black ——————————————————— 2.5%
    Bodied linseed oil and drier ———— 45.0%
    Turpentine substitute ———————————— 52.5%
  Final coat—Asphalt varnish
    Petroleum asphalt ———————————— 25%
    Turpentine substitute ————————— 75%
Example 4—Two-coat system:
  Intermediate coat—Oil varnish
    Carbon black ——————————————————— 2.5%
    Bodied Chinawood oil ———————————— 20.0%
    Bodied linseed oil ——————————————— 20.0%
    Petroleum residue asphalt ———————— 3.5%
    Turpentine substitute ———————————— 54.0%
  Final coat—Asphalt varnish
    Petroleum asphalt ———————————— 25%
    Gasoline ———————————————————— 75%
Example 5—Two-coat system:
  Intermediate coat—Oil varnish same as intermediate coat in Example 4.
  Final coat—Asphalt varnish
    Petroleum asphalt ———————————— 20%
    Bodied Chinawood oil ————————— 12%
    Turpentine substitute ————————— 68%
Example 6—Two-coat system:
  Intermediate coat—Oil varnish same as intermediate coat of Example 3.
  Final coat—Asphalt varnish same as final coat of Example 5.
Example 7—Two-coat system:
  Intermediate coat—Oil varnish same as intermediate coat in Example 3.
  Final coat—Asphalt varnish
    Petroleum asphalt ———————————— 25%
    Bodied Chinawood oil ————————— 5%
    Gasoline ———————————————————— 70%
Example 8—Two-coat system:
  Intermediate coat—Oil varnish same as intermediate coat in Example 4.
  Final coat—Asphalt varnish
    Petroleum asphalt ———————————— 25%
    Bodied linseed oil ——————————————— 5%
    Gasoline ———————————————————— 70%

By the term "layer," as used herein, I mean a coating as distinguished from a pre-formed sheet.

I claim:

1. A process of finishing a rubber-coated textile fabric which comprises applying over the rubber a final coat of petroleum asphalt varnish, and baking it at a temperature which is higher than the softening point of the asphalt.

2. A process of finishing a rubber-coated textile fabric which comprises applying over the rubber a final coat of petroleum asphalt varnish, and baking it at the vulcanizing temperature of the rubber compound.

3. A process of finishing a rubber-coated textile fabric which comprises applying over the rubber a final coat of petroleum asphalt varnish containing from 2½ to 7½ gallons of vegetable drying oil to 100 pounds of asphalt, and baking it at a temperature which is higher than the softening point of the asphalt.

4. A process as disclosed in claim 1 wherein the petroleum asphalt varnish contains less oil than petroleum asphalt.

5. A process of finishing a rubber-coated fabric which comprises applying over the uncured rubber a coat of oil varnish, drying the oil varnish coat, then applying a final coat of asphalt varnish, and baking it at a temperature which is higher than the softening point of the saphalt.

6. A process of finishing a rubber-coated fabric which comprises applying over the uncured rubber a coat of oil varnish, drying the oil varnish coat, then applying a final coat of asphalt varnish, and baking it at the vulcanizing temperature of the rubber compound.

7. A process of finishing a rubber-coated fabric which comprises applying over the rubber a coat of oil varnish, drying the oil varnish coat, and then applying a final coat of asphalt varnish.

8. As an article of manufacture a rubber-coated textile fabric having a final coat of petroleum asphalt varnish.

9. As an article of manufacture a rubber-coated fabric having an intermediate coat of oil varnish and a final coat of petroleum asphalt varnish.

10. As an article of manufacture a rubber-coated fabric having an intermediate coat of oil varnish and a final coat of baked asphalt varnish.

11. A process of finishing a rubber coated textile fabric which comprises applying over the rubber a final coat of asphalt varnish containing between 2½ and 20 gallons of vegetable drying oil per 100 pounds of asphalt, and baking it at the vulcanizing temperature of the rubber compound.

12. As an article of manufacture a rubber coated textile fabric having a final coat of baked asphalt varnish containing between 2½ and 20 gallons of vegetable drying oil per 100 pounds of asphalt.

13. A process of finishing a rubber coated fabric which comprises applying over the uncured rubber an intermediate coat of varnish, drying said varnish coat, then applying a final coat of asphalt varnish and baking the latter at the vulcanizing temperature of the rubber compound, the final coat comprising a varnish containing between 2½ and 20 gallons of drying oil per 100 pounds of asphalt, and the intermediate coat comprising a varnish which is longer in oil than the final coat of varnish.

14. A process of finishing a rubber coated fabric which comprises applying over the uncured rubber an intermediate coat of varnish, drying said varnish coat, then applying a final coat of asphalt varnish and baking the latter at the vulcanizing temperature of the rubber compound, the final coat comprising a varnish containing between 2½ and 20 gallons of vegetable drying oil per 100 pounds of asphalt, and the intermediate coat comprising a varnish which is more elastic than the final coat of varnish.

15. As an article of manufacture, a rubber coated fabric having an intermediate coat of varnish and a final coat of asphalt varnish, the final coat comprising a varnish containing between 2½ and 20 gallons of vegetable drying oil per 100 pounds of asphalt and the intermediate coat comprising a varnish which is longer in oil than the final coat of varnish.

16. A process of making an artificial leather which comprises applying over a textile fabric a layer of uncured rubber, applying a coating of petroleum asphalt varnish thereover, and baking the resulting product.

17. An artificial leather comprising a baked coat which includes a layer of vulcanized rubber and a superposed layer of petroleum asphalt varnish.

18. As an article of manufacture, a rubber coated flexible fabric sheeting having a final coat of baked petroleum asphalt varnish.

19. As an article of manufacture, a rubber coated automobile top material having a final coat of baked petroleum asphalt varnish.

In testimony whereof I affix my signature.

JOHN R. COUTURE.